(No Model.)
H. E. LUDWIG.
PULLEY.
No. 406,361.  Patented July 2, 1889.
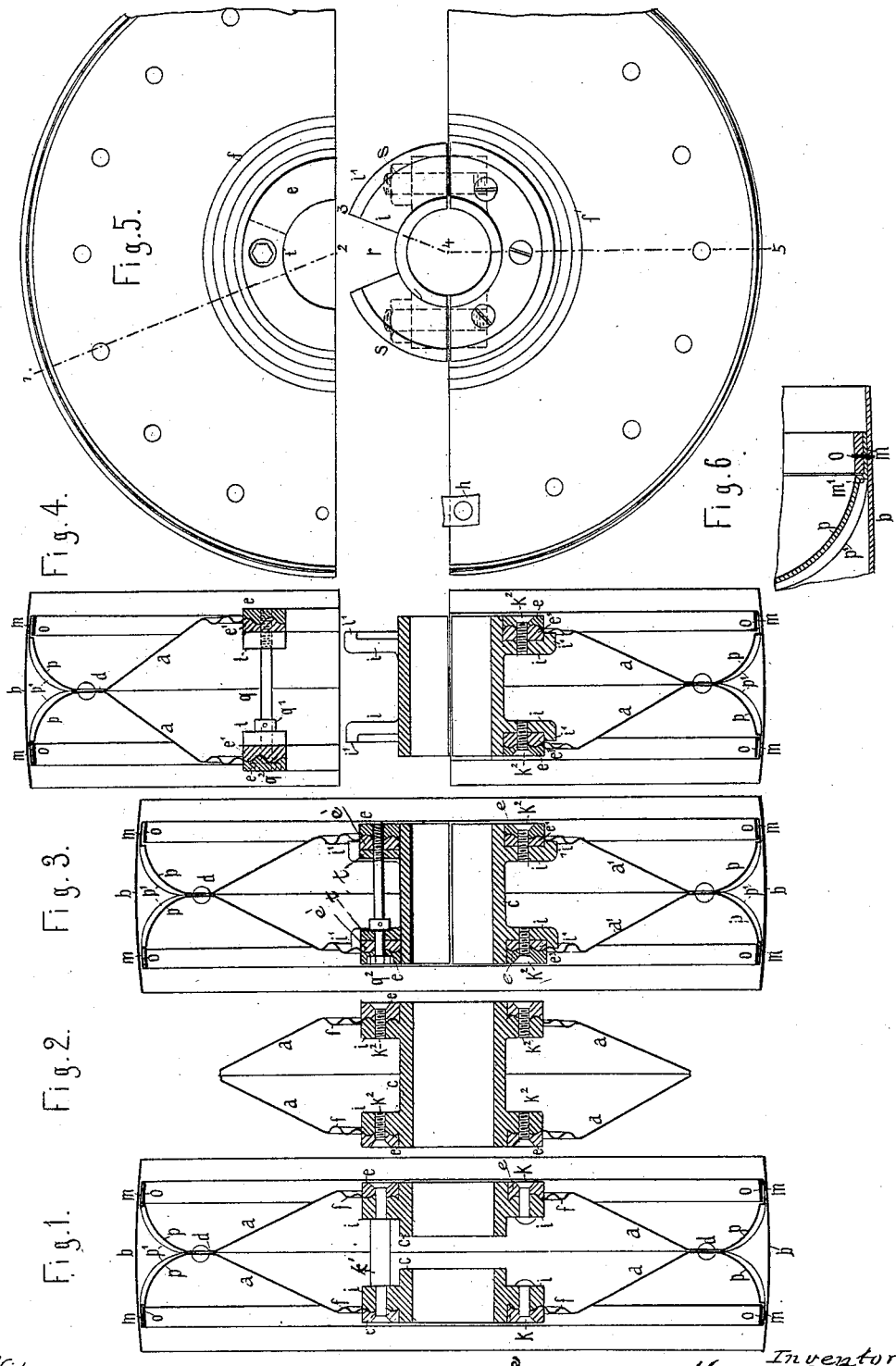

UNITED STATES PATENT OFFICE.

HEINRICH EMANUEL LUDWIG, OF BERNE, SWITZERLAND.

PULLEY.

SPECIFICATION forming part of Letters Patent No. 406,361, dated July 2, 1889.

Application filed November 30, 1888. Serial No. 292,191. (No model.)

*To all whom it may concern:*

Be it known that I, HEINRICH EMANUEL LUDWIG, a citizen of Switzerland, residing at Berne, Switzerland, have invented new and useful Improvements in Wheels and Pulleys, whereof the following is a specification.

My invention relates to wheels and pulleys the hub or nave and rim whereof are connected together by two sheet-metal disks, and it is principally designed to be applied to wheels and pulleys in which the said disks are fixed together on a circle between their outer edge and their central portion and diverge from each other on both sides of the said circle.

The improvements constituting my invention are as follows: The disks are provided upon their central portion with one or more corrugations corresponding to circles drawn around their center. The hub or nave is provided with flanges having on their outer face like corrugations, and the disks, after having been brought in juxtaposition with the said flanges, are secured thereto by means of rings corrugated on their inner face and by screws or rivets. The connection between the rim and the disk is obtained through the medium of flanges formed on the latter, together with radial offsets between the outer diverging portions of the disks and the said flanges, by rings placed inside of the flanges and by rivets. For strengthening the outer diverging portions of the disks these are made with radial corrugations. In divided wheels and pulleys the flanges of the hub or nave are fitted each with an outwardly-projecting rim. The disk-halves have ring parts riveted to both sides of their central portion, the inner ring parts being of such size as to fit between the cylindrical body of the hub or nave and the projecting rim of the flanges, and one part of the wheel or pulley is provided with a screw whereby the central portions of its semi-disks may be spread asunder sufficiently to allow the inner ring parts to pass over the projecting rims of the flanges, and by means whereof they may be drawn together again after the said part of the wheel or pulley has been brought into its place. Moreover, one or both flanges of the hub or nave of the divided wheel or pulley are provided with a recess, and the corresponding inner ring parts with a projection engaging in the said recess when the parts are put together.

In the annexed drawings, Figure 1 shows in vertical section an undivided pulley provided with my improvements. Fig. 2 is a section showing a modification of the construction. Fig. 3 is a vertical section of a divided pulley with its parts united. Fig. 4 is a section on lines 1 2 and 3 4 5, Fig. 5, showing the same pulley with the upper part disconnected from the lower part. Fig. 5 is an elevation corresponding to Fig. 4; and Fig. 6, a detail sectional view of a part of a disk drawn to a larger scale.

In Fig. 1, $c$ is the hub or nave made in two parts. $b$ is the rim, and $a\,a$ are the disks connecting together the hub or nave and the rim, the said disks being formed to touch each other on the circle $d$ and riveted together on this circle, while they diverge one from the other toward the hub or nave and toward the rim. The disks are provided with several concentric corrugations $f$, the face view whereof is alike to that of the corrugations $f$ shown in Fig. 5, except that the disks $a$ are undivided. The hub or nave parts have the flanges $i\,i$, to which the disks $a$ are fixed by means of the rings $e$ and rivets $k$. Instead of the latter, stay-bolts $k'$, forming rivets at their ends, may be employed; or rivets $k$ and stay-bolts $k'$ are used in alternation. The outer face of the flanges $i$ and the inner face of the rings $e$ are turned to fit to the corrugations of the disks $a$, a secure connection of the parts being thus attained. The disks are preferably manufactured with a greater number of corrugations $f$ than are required for one pulley, in order that they may be combined with naves of different diameters, according to the size of the shafts on which the pulleys are to be fixed. Fig. 2 shows a hub or nave $c$, made in one piece, and the disks $a$ and rings $e$ secured to the flanges $i$ by screws $k^2$.

For the purpose of fastening the rim $b$ to the disks, the latter are provided each with a flange $m$, (see also Fig. 6,) formed, together with a short offset $m'$, upon the part $p$ of the disk, and inside of the flange a ring $o$ is placed. The connection of the parts is completed by means of rivets. The offset $m'$ is of advantage for strengthening the disk at its periphery and for keeping it perfectly round on its leaving the press in which it is molded. $p'$ are the radial corrugations, serving to impart additional strength or stiffness to the disk part $p$.

In the divided pulley represented by Figs. 3, 4, and 5 each flange $i$ of the hub or nave is provided at its periphery with a rim $i'$, projecting over its outer face, and each disk part is fitted, in addition to the outer half-ring $e$, with an inner half-ring $e'$, the latter fitting into the recess formed by the flange $i$, the rim $i'$, and the cylindrical body of the hub or nave. The hub or nave parts are united together by screws $s$ and nuts placed between the flanges $i$, and one part of the pulley is provided with a screw $q$, bearing with a collar $q'$, against one of the ring-halves $e'$, while it works with its threads in the other ring-half. The screw is arranged to be turned by a key applied to its head $q^2$. By means of this screw the central portions of the two disk parts may be spread farther apart and drawn together again.

When the pulley is to be mounted on the shaft designed to carry the same, the pulley part unprovided with screw $q$ and the nave part of the other pulley part are first put together on the shaft by means of the screws $s$, the nuts whereof are at the time free for the application of a suitable key. Thereupon the distance between the disk-halves of the pulley part having the screw $q$ is increased by means of the said screw until the rings $e'$ will pass by the sides of the rims $i'$, the pulley part is pushed into its place, and the screw $q$ is turned back until the rings $e'$ bear against the flanges $i$. This divided pulley has the advantage of not presenting any projecting parts adapted to cause accidents. For further connection of the disk parts any known means—such as the fish-plates $h$—may be employed.

As shown in the drawings, relatively to the lower half of the pulley, the disk parts thereof are secured, together with the ring-halves $e$ and $e'$, to the corresponding flanges $i$ by means of screws $k^2$, in like manner as stated in respect to the pulley, Fig. 2. If this connection should not be considered sufficient for preventing the disks from becoming loose on the hub or nave, the flanges $i$ may be provided with recesses $r$ and the rings $e'$ with projections $t$, fitting into the said recesses, every possibility of the disks turning on the nave being thereby prevented.

I claim as my invention—

1. The combination of the hub or nave, the sheet-metal disks $a$, secured to each other on a circle $d$ and having each the outwardly-bent portion $p$, with flange $m$ and offset $m'$, rim $b$, rings $o$, and means for fastening together the rim, the disks, and the rings, substantially as specified.

2. The combination of the divided hub or nave $c$, having flanges $i$, with projecting rim $i'$, divided disks $a$, having one or more corrugations $f$, divided rings $e$ and $e'$, corrugated on the side facing the disks, screw $q$, and means for securing together the disks, the rings, and the flanges $i$, substantially as described.

3. The combination of the divided hub or nave $c$, having flanges $i$, with recess $r$, divided disks $a$, having one or more corrugations $f$, divided rings $e$ and $e'$, corrugated on the side facing the disks and the rings $e'$ being each provided with a projection $t$, and means for securing together the disks, the rings, and the flanges, substantially as set forth.

In testimony whereof I have hereunto set my hand in the presence of two subscribing witnesses.

HEINRICH EMANUEL LUDWIG.

Witnesses:
KARL LIPS,
BERNHARD KETTELER.